US008632652B2

United States Patent
Lee et al.

(10) Patent No.: US 8,632,652 B2
(45) Date of Patent: Jan. 21, 2014

(54) METHOD FOR MANUFACTURING SEPARATOR, SEPARATOR MANUFACTURED THEREFROM AND METHOD FOR MANUFACTURING ELECTROCHEMICAL DEVICE HAVING THE SAME

(75) Inventors: Joo-Sung Lee, Daejeon (KR); Jang-Hyuk Hong, Daejeon (KR); Jong-Hun Kim, Daejeon (KR)

(73) Assignee: LG Chem, Ltd. (KR)

( * ) Notice: Subject to any disclaimer, the term of this patent is extended or adjusted under 35 U.S.C. 154(b) by 21 days.

(21) Appl. No.: 13/124,215

(22) Filed: Apr. 14, 2011

(65) Prior Publication Data

US 2011/0259505 A1   Oct. 27, 2011

Related U.S. Application Data

(63) Continuation of application No. PCT/KR2010/005279, filed on Aug. 11, 2010.

(30) Foreign Application Priority Data

Sep. 29, 2009 (KR) .................. 10-2009-0092364
Aug. 11, 2010 (KR) .................. 10-2010-0077145

(51) Int. Cl.
*B29C 65/00* (2006.01)
*B05D 1/34* (2006.01)
*B05D 1/36* (2006.01)
*H01M 2/16* (2006.01)

(52) U.S. Cl.
USPC ..... 156/276; 156/306.6; 427/358; 427/385.5; 427/407.1; 429/144

(58) Field of Classification Search
USPC ............... 156/276, 306.6; 427/121, 356, 358, 427/385.5, 407.1; 429/144, 145
See application file for complete search history.

(56) References Cited

U.S. PATENT DOCUMENTS

| 2004/0053122 | A1* | 3/2004 | Sugiyama et al. ............ 429/144 |
| 2006/0008700 | A1* | 1/2006 | Yong et al. .................... 429/144 |
| 2009/0067119 | A1  | 3/2009 | Katayama et al. |
| 2011/0123850 | A1* | 5/2011 | Duong et al. ................. 429/145 |

FOREIGN PATENT DOCUMENTS

| JP | 2009518808 A | 5/2009 |
| JP | 2009529762 A | 8/2009 |
| KR | 20090032772 A | 4/2009 |
| KR | 20090055304 A | 6/2009 |
| WO | 2007066768 A1 | 6/2007 |

OTHER PUBLICATIONS

International Search Report for Application No. PCT/KR2010/005279 dated Mar. 8, 2011.

* cited by examiner

*Primary Examiner* — Michael Tolin
(74) *Attorney, Agent, or Firm* — Lerner, David, Littenberg, Krumholz & Mentlik, LLP

(57) ABSTRACT

Disclosed is a method for manufacturing a separator for an electrochemical device. The method contributes to formation of a separator with good bondability to electrodes and prevents inorganic particles from detaching during an assembling process of an electrochemical device.

14 Claims, 2 Drawing Sheets

METHOD FOR MANUFACTURING SEPARATOR, SEPARATOR MANUFACTURED THEREFROM AND METHOD FOR MANUFACTURING ELECTROCHEMICAL DEVICE HAVING THE SAME

CROSS-REFERENCE TO RELATED APPLICATION

This application is a continuation of International Application No. PCT/KR2010/005279 filed on Aug. 11, 2010, which claims priority to Korean Patent Application No. 10-2009-0092364 filed in Republic of Korea on Sep. 29, 2009, and Korean Patent Application No. 10-2010-0077145 filed in Republic of Korea on Aug. 11, 2010, the entire contents of which are incorporated herein by reference.

TECHNICAL FIELD

The present invention relates to a method for manufacturing a separator used for an electrochemical device such as a lithium secondary battery, a separator manufactured therefrom, and a method for manufacturing an electrochemical device having the same. More particularly, the present invention relates to a method for manufacturing a separator in which an organic-inorganic composite porous coating layer made from a mixture of a binder polymer and inorganic particles is formed on at least one surface of a porous substrate, a separator manufactured therefrom, and a method for manufacturing an electrochemical device having the same.

BACKGROUND ART

Recently, there has been an increasing interest in energy storage technologies. As batteries have been widely used as energy sources in the fields of mobile phones, camcorders, notebook computers and even electric cars, research and development has been increasingly made on the batteries. Among the batteries, electrochemical devices, in particular, rechargeable secondary batteries are the center of attention. Recent trends of study move toward new designs of electrodes and batteries to improve capacity density and specific energy.

Among currently available secondary batteries, lithium secondary batteries that were developed in early 1990's have a higher operating voltage and a much higher energy density than those of conventional batteries using a liquid electrolyte such as Ni—MH batteries, Ni—Cd batteries, and $H_2SO_4$—Pb batteries. These characteristics of the lithium secondary batteries afford advantages. However, the lithium secondary batteries have disadvantages such as a complicate manufacturing process and safety-related problems caused by use of an organic electrolyte, for example, firing, explosion, and the like. Lithium-ion polymer batteries are considered as more suitable next-generation batteries than lithium ion batteries. However, lithium-ion polymer batteries have a relatively lower battery capacity than lithium ion batteries, and have an insufficient discharging capacity at low temperature. Accordingly, there is an urgent need to solve these disadvantages of the lithium-ion polymer batteries.

A variety of electrochemical devices have been produced from many companies, and each exhibits different safety characteristics. Thus, it is important to evaluate and ensure safety of the electrochemical devices. First of all, electrochemical devices should not cause any damage to users due to malfunction. Taking this into account, Safety Regulations strictly prohibit safety-related accidents of electrochemical devices such as firing or smoke emission. According to the safety characteristics of electrochemical devices, explosion may occur when an electrochemical device is overheated and subject to thermal runaway, and when a separator is punctured. In particular, when an electrochemical device is at a temperature of 100° C. or above, a polyolefin-based porous substrate that is commonly used as a separator of the electrochemical device shows a significant thermal shrinking behavior due to its material characteristics and manufacturing characteristics such as elongation, so that a short circuit may occur between a cathode and an anode.

In order to solve the above safety-related problems of the electrochemical device, a separator has been suggested in which an organic-inorganic composite porous coating layer made from a mixture of a binder polymer and inorganic particles is formed on at least one surface of a porous substrate with a plurality of pores. For example, Korean Patent Laid-open No. 2007-0019958 discloses a separator in which a porous coating layer made from a mixture of a binder polymer and inorganic particles is formed on the surface of a porous substrate.

In a separator with the organic-inorganic composite porous coating layer, the inorganic particles in the porous coating layer formed on the porous substrate serve as a spacer that keeps a physical shape of the porous coating layer, so the inorganic particles may restrain thermal shrinkage of the porous substrate when an electrochemical device is overheated, and accordingly, prevent a short circuit between a cathode and an anode from occurring when thermal runaway occurs at the electrochemical device.

To show the above-mentioned functions of the organic-inorganic composite porous coating layer formed on the porous substrate, the inorganic particles should be sufficiently included in at least a predetermined content. However, the higher content of the inorganic particles, the relatively lower content of the binder polymer, and as a result, bondability of the separator to electrodes is reduced and the inorganic particles are apt to detach from the porous coating layer due to contact with the external environment or stresses occurring during an assembling process of an electrochemical device such as a winding process. The reduction in bondability to electrodes results in reduction in performance of the electrochemical device, and the detached inorganic particles act as a local defect of the electrochemical device, thereby giving a bad influence on safety of the electrochemical device.

DISCLOSURE OF INVENTION

The present invention is designed to solve the problems of the prior art, and therefore an aspect of the invention is to provide a method for easily manufacturing a separator which has good bondability to electrodes and has improvement in detachment of inorganic particles occurring during an assembling process of an electrochemical device, and a separator manufactured therefrom and an electrochemical device having such a separator.

The present invention provides a method for manufacturing a separator, including the steps of (S1) preparing a porous substrate having pores; (S2) coating a slurry on at least one surface of the porous substrate, the slurry containing inorganic particles dispersed therein and a first binder polymer dissolved in a first solvent; (S3) coating a binder solution on the slurry, the binder solution containing a second binder polymer dissolved in a second solvent; and (S4) simultaneously drying the first and second solvents to form a porous polymer outer layer of the second binder polymer and an organic-inorganic composite inner layer, wherein the porous polymer outer layer has pores formed while the second solvent is dried, and the organic-inorganic composite inner layer has pores or interstitial volumes formed between the inorganic particles when the inorganic particles are bonded and fixed to each other by the first binder polymer while the first solvent is dried.

In the method for manufacturing a separator of the present invention, the porous substrate is preferably a polyolefin-based porous membrane, and its preferred thickness is 1 to 100 μm (micrometer).

In the method for manufacturing a separator of the present invention, the inorganic particles may have a preferred average particle size between 0.001 and 10 μm, and may use inorganic particles having a dielectric constant of 5 or above, or inorganic particles having lithium ion conductivity, singularly or in combination.

In the method for manufacturing a separator of the present invention, a weight ratio of the inorganic particles to the first binder polymer may be preferably 50:50 to 99:1, and each of the first binder polymer and the second binder polymer may have a preferred solubility parameter between 15 and 45 $Mpa^{1/2}$, independently. The first and second binder polymers may include, not limited to, polyvinylidene fluoride-co-hexafluoropropylene, polyvinylidene fluoride-co-trichloroethylene, polymethylmethacrylate, polybtylacrylate, polyacrylonitrile, polyvinylpyrrolidone, polyvinylacetate, polyethylene-co-vinylacetate, polyethylene oxide, polyarylate, cellulose acetate, cellulose acetate butyrate, cellulose acetate propionate, cyanoethylpullulan, cyanoethylpolyvinlyalcohol, cyanoethylcellulose, cyanoethylsucrose, pullulan, and carboxyl methyl cellulose, singularly or in combination.

In the step (S3) of the method for manufacturing a separator of the present invention, the second binder polymer in the binder solution may have a preferred content between 0.1 and 30 weight %, which is advantageous to form sufficient pores during drying and improve bondability to electrodes.

A separator manufactured by the above-mentioned method may be interposed between a cathode and an anode, followed by laminating, to manufacture an electrochemical device, for example, a lithium secondary battery or a super capacitor.

A separator manufactured by the method of the present invention has the following characteristics:

First, a porous polymer outer layer formed on the surface of an organic-inorganic composite inner layer may improve bondability of a separator to electrodes and allow easy lamination.

Secondly, a porous polymer outer layer may serve as a mesh to prevent inorganic particles from detaching from an organic-inorganic composite inner layer, and accordingly, to prevent subsequent problems which may be caused by detachment of the inorganic particles. Also, this function of the porous polymer outer layer prevents the content loss of the inorganic particles in the organic-inorganic composite inner layer, thereby improving stability of a separator.

DETAILED DESCRIPTION

Figure 1:
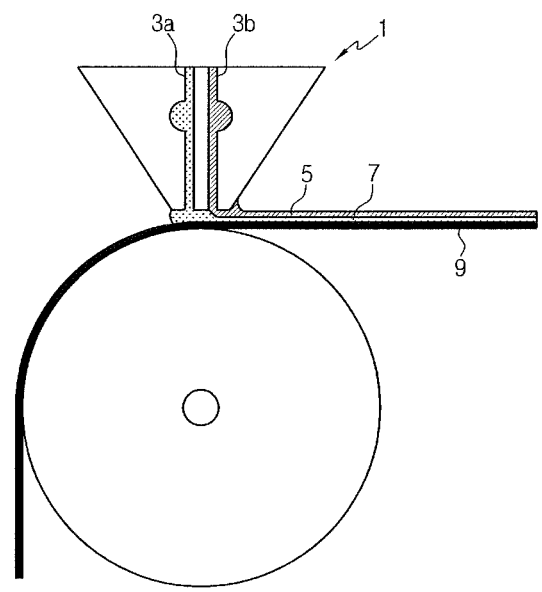
FIG. 1 is a schematic flowchart illustrating a method for manufacturing a separator according to an embodiment of the present invention.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

A method for manufacturing a separator according to the present invention is described in detail as follows.

First, a porous substrate having pores is prepared (S1).

The porous substrate may use any porous substrate generally used for electrochemical devices, for example, a porous membrane of various polymers or a non-woven fabric. For example, the porous substrate may use a polyolefin-based porous membrane that is used as a separator of electrochemical devices, in particular, lithium secondary batteries, or a non-woven fabric made from polyethylenephthalate fibers, and the material or shape may vary depending on a desired purpose. For example, the polyolefin-based porous membrane may be produced from polyolefin-based polymers, such as polyethylene including HDPE (high density polyethylene), LLDPE (linear low density polyethylene), LDPE (low density polyethylene) and UHMWPE (ultra high molecular weight polyethylene), polypropylene, polybutylene, polypentene, and the like, singularly or in combination. The non-woven fabric may be produced from fibers using polyolefin-based polymer or polymer with higher heat resistance. The thickness of the porous substrate is not specially limited, but is preferably 1 to 100 μm, more preferably, 5 to 50 μm. The pore size and porosity of the porous substrate are also not specially limited, but are preferably 0.01 to 50 μm and 10 to 95%, respectively.

Subsequently, a slurry in which inorganic particles are dispersed and a first binder polymer is dissolved in a first solvent, is coated on at least one surface of the porous substrate (S2).

The inorganic particles are not specially limited if they are electrically and chemically stable. In other words, the present invention is not limited to specific type of inorganic particles if the inorganic particles do not cause an oxidation and/or reduction reaction within an operating voltage range (for example, 0 to 5V based on $Li/Li^+$) of an electrochemical device applied thereto. In particular, inorganic particles having a high dielectric constant may contribute to an increase in the degree of dissociation of electrolyte salts in an electrolyte, for example, the degree of dissociation of lithium salts, thereby improving ion conductivity of the electrolyte.

For the above-mentioned reasons, the inorganic particles may preferably use inorganic particles having a high dielectric constant of 5 or above, preferably 10 or above. As a non-limiting example, the inorganic particles having a high dielectric constant of 5 or above may include $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, MgO, NiO, CaO, $ZnO_2$, $ZrO_2$, $Y_2O_3$, $Al_2O_3$, $TiO_2$, SiC, or their mixtures.

Also, the inorganic particles may use inorganic particles having lithium ion conductivity, that is, inorganic particles containing lithium atoms and having a function of moving lithium ions, but not storing the lithium ions. As a non-limiting example, the inorganic particle having lithium ion conductivity may include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitrides ($Li_xN_y$, $0<x<4$, $0<y<2$) such as $Li_3N$, $SiS_2$-based glass ($Li_xSi_yS_z$, $0<x<3$, $0<y<2$, $0<z<4$) such as $Li_3PO_4$—$Li_2S$—$SiS_2$, $P_2S_5$-based glass ($Li_xP_yS_z$, $0<x<3$, $0<y<3$, $0<z<7$) such as LiI—$Li_2S$—$P_2S_5$, or their mixtures.

An average particle size of the inorganic particles is not specially limited, but is preferably 0.001 to 10 µm to form a coating layer of uniform thickness and ensure suitable porosity. If the average particle size is less than 0.001 µm, a dispersing performance of the inorganic particles may be deteriorated, and if the average particle size exceeds 10 µm, the thickness of a resulting coating layer may be increased.

The first binder polymer may preferably use polymer with a glass transition temperature (Tg) between $-200°$ C. and $200°$ C., which may improve the mechanical properties of a resulting coating layer, including flexibility, elasticity, and the like.

Also, the first binder polymer does not necessarily need to have ion conductivity, however the use of polymer having ion conductivity may further improve the performance of electrochemical devices. Accordingly, it is preferred that the first binder polymer has a high dielectric constant. In practice, because the degree of dissociation of salts in an electrolyte is dependent on a dielectric constant of an electrolyte solvent, the higher dielectric constant of the first binder polymer, the higher degree of dissociation of salts in the electrolyte. Preferably, the dielectric constant of the first binder polymer is in the range between 1.0 and 100 (the measured frequency=1 kHz), particularly 10 or above.

In addition to the above-mentioned functions, the first binder polymer may be gelled by a liquid electrolyte, and thus exhibit a high degree of swelling in the electrolyte. Accordingly, it is preferred to use polymers having a solubility parameter between 15 and 45 $Mpa^{1/2}$, more preferably between 15 and 25 $Mpa^{1/2}$ and between 30 and 45 $Mpa^{1/2}$. For example, hydrophilic polymers rich with polar groups are preferred, rather than hydrophobic polymers such as polyolefins. When the solubility parameter is less than 15 $Mpa^{1/2}$ and exceeds 45 $Mpa^{1/2}$, the first binder polymer is less prone to swelling by a typical liquid electrolyte.

As a non-limiting example, the first binder polymer may include polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinylacetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose, singularly or in combination.

A weight ratio of the inorganic particles to the first binder polymer is preferably 50:50 to 99:1, more preferably 70:30 to 95:5. If the ratio of the inorganic particles to the first binder polymer is less than 50:50, the content of the polymer increases, which may reduce a pore size and a porosity of a resulting coating layer. If the content of the inorganic particles exceeds 99 parts by weight, the content of the first binder polymer reduces, which may reduce a peeling resistance of a resulting coating layer.

Preferably, a solvent for the first binder polymer, i.e., the first solvent may have a solubility parameter similar to and a boiling point lower than the first binder polymer used. This may lead to uniform mixing and subsequent easy removal of the solvent. As a non-limiting example, available first solvents may include acetone, tetrahydrofuran, methylene chloride, chloroform, dimethylformamide, N-methyl-2-pyrrolidone (NMP), cyclohexane and water, or their mixtures.

The slurry, in which the inorganic particles are dispersed and the first binder polymer is dissolved in the first solvent, may be prepared by dissolving the first binder polymer in the first solvent, adding the inorganic particles thereto, and dispersing the inorganic particles therein. The inorganic particles may be added after milling at a proper size, and the inorganic particles may preferably be added to a solution of the first binder polymer and dispersed therein while being milled by ball-milling.

A loading amount of the slurry for coating the porous substrate may be adjusted such that a resulting coating layer has a loading amount between 5 and 20 $g/m^2$. It is preferred to adjust a loading amount of the slurry in consideration of a function of a resulting coating layer and applicability to a high capacity battery.

Next, a binder solution, in which a second binder polymer is dissolved in a second solvent, is coated on the slurry (S3).

The second binder polymer and the second solvent may use the first binder polymer and the first solvent mentioned above, respectively. The first binder polymer may be identical to or different from the second binder polymer, and the first solvent may be also identical to or different from the second solvent. The content of the second binder polymer in the binder solution may be 0.1 to 30 weight %, and the exemplary content of the second binder polymer is advantageous to form sufficient pores during drying and increase bondability to electrodes. Also, a loading amount of the binder solution may be adjusted such that a resulting coating layer has a loading amount between 0.1 and 3.0 $g/m^2$. It is preferred to adjust a loading amount of the binder solution in consideration of porosity of a resulting coating layer and bondability to electrodes.

The slurry coating step (S2) and the binder solution coating step (S3) may be performed in succession or in non-succession using various methods including slot die coating, slide coating, curtain coating, and the like. In particular, the slurry coating step (S2) and the binder solution coating step (S3) may be preferably performed in succession or at the same time so as to improve productivity, and the most preferred example is illustrated in FIG. 1.

Referring to FIG. 1, a die 1 with two slots 3a and 3b is used to perform the slurry coating step (S2) and the binder solution coating step (S3). The first slot 3a is used to distribute a slurry 7 in which the inorganic particles are dispersed and the first binder polymer is dissolved in the first solvent. The second slot 3b is used to distribute a binder solution 5 in which the second binder polymer is dissolved in the second solvent. When a porous substrate 9 is provided at a rotating roller, the slurry 7 is coated on the porous substrate 9, and subsequently, the binder solution 5 is coated on the slurry 7.

Finally, the first and second solvents existing in the slurry coated on the porous substrate and the binder solution are simultaneously dried to form a porous polymer outer layer of the second binder polymer having pores formed while the second solvent is dried, and to form a porous organic-inorganic composite inner layer having pores or interstitial volumes formed between the inorganic particles when the inorganic particles are bonded and fixed to each other by the first binder polymer while the first solvent is dried (S4).

In the step (S4) of the present invention, it needs to simultaneously dry the first and second solvents existing in the slurry coated on the porous substrate and the binder solution for the following reasons:

When the result of the step (S3) is gone through a drier or the like, the binder solution coated on the slurry is subject to heat or thermal breeze. Accordingly, the second solvent in the binder solution coated along the outer periphery is dried earlier than the first solvent in the slurry. That is, a porous polymer outer layer of the second binder polymer having pores formed during drying of the second solvent is formed earlier because drying of the second solvent is completed earlier than that of the first solvent. Subsequently, after drying of the first solvent in the slurry is completed, formed is then a porous organic-inorganic composite inner layer having pores or interstitial volumes formed between the inorganic particles when the inorganic particles are bonded and fixed to each other by the first binder polymer.

As mentioned above, as the porous polymer outer layer is first formed and then the first solvent in the slurry is dried, the porous polymer outer layer may compose an independent outer layer (a skin layer) that is awkward to permeate into the interstitial volumes between the inorganic particles. The porous polymer outer layer as an independent layer is advantageous to increase bondability to electrodes, thereby contributing to easy lamination. Also, the porous polymer outer layer may prevent the inorganic particles of the organic-inorganic composite inner layer from contacting with the external environment, and consequently from detaching from the organic-inorganic composite inner layer during a battery assembly process. In addition, when a portion of the inorganic particles are detached from the organic-inorganic inner layer due to insufficient adhesive strength, the porous polymer outer layer may serve as a mesh to prevent the detached inorganic particles from discharging. Accordingly, the content of the inorganic particles in the organic-inorganic composite inner layer may be increased in consideration of a function of the porous polymer outer layer for improving stability of a separator.

As opposed to the present invention, when a slurry, in which the first binder polymer is dissolved in the first solvent, is first dried to form an organic-inorganic composite coating layer, and then a binder solution, in which the second binder polymer is dissolved in the second solvent, is applied thereto, the binder solution is permeated into the interstitial volumes between the inorganic particles. Consequently, porosity of the organic-inorganic composite coating layer is remarkably reduced, thereby adversely affecting the performance of a battery and making it difficult to form an independent polymer outer layer (a skin layer). As a result, it leads to deterioration in a function of the polymer outer layer for improving bondability to electrodes, and a function as a mesh layer for preventing the inorganic particles from contacting with the external and from discharging.

The separator manufactured by the above-mentioned method may be interposed between a cathode and an anode, followed by laminating, to manufacture an electrochemical device. The electrochemical device may be any device in which an electrochemical reaction may occur, and include all kinds of batteries, for example, primary batteries, secondary batteries, fuel cells, solar cells or capacitors such as super capacitors. In particular, among the secondary batteries, lithium secondary batteries are preferred, for example, lithium metal secondary batteries, lithium ion secondary batteries, lithium polymer secondary batteries or lithium ion polymer secondary batteries.

The present invention is not limited to a specific type of electrode (a cathode and an anode) if it may be used together with the separator of the present invention, and the electrode may be manufactured in such a way that an electrode active material is adhered to an electrode current collector by methods known in the art. In the electrode active material, a cathode active material may preferably use, as a non-limiting example, typical cathode active materials for a cathode of conventional electrochemical devices, in particular, lithium manganese oxides, lithium cobalt oxides, lithium nickel oxides, lithium iron oxides, or lithium composite oxides thereof. As a non-limiting example, an anode active material may preferably use typical anode active materials for an anode of conventional electrochemical devices, in particular, lithium intercalation materials such as lithium metal, lithium alloy, carbon, petroleum coke, activated carbon, graphite, or other carbonaceous materials. As a non-limiting example, a cathode current collector may be a foil made of aluminum, nickel, or combinations thereof, and an anode current collector may be a foil made of copper, gold, nickel, copper alloys, or combinations thereof.

The electrolyte useable in the present invention includes a salt represented by the formula of $A^+B^-$, wherein $A^+$ represents an alkali metal cation such as $Li^+$, $Na^+$, $K^+$, or combinations thereof, and $B^-$ represents a salt containing an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combinations thereof. The salt may be dissolved or dissociated in an organic solvent such as propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone), or their mixtures, however, the present invention is not limited thereto.

The electrolyte may be injected in a suitable step of a battery manufacturing process, depending on a manufacturing process and desired properties of a final product. In other words, the electrolyte may be injected before a battery assembly process, during a final step of the battery assembly process, or the like.

EXAMPLES

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

Example 1

Each of polyvinylidene fluoride-co-chlorotrifluoroethylene (PVdF-CTFE) and cyanoethylpullulan was added to acetone at a weight ratio of 10:2 and dissolved at 50□ for about 12 hours or longer to prepare a binder polymer solution. Barium titanate ($BaTiO_3$) powder was added to the prepared binder polymer solution at a weight ratio of polymer mixture/powder=10/90, and inorganic particles was milled and dispersed for 12 hours or longer by ball milling, to produce a slurry. The inorganic particles in the produced slurry had an average particle size of 600 nm.

Next, a polymer solution with a polymer concentration of 2.0 weight % was prepared using the polymer mixture and the solvent contained in the slurry.

The slurry and the polymer solution prepared as mentioned above were sequentially coated on one surface of a porous polyethylene membrane (45% porosity) with thickness of 12 μm through a slot die of FIG. 1. Each loading amount of the slurry and the polymer solution was adjusted such that each loading amount of a resulting porous organic-inorganic composite inner layer and a resulting porous polymer outer coating layer is 12.5 g/m$^2$ and 1.8 g/m$^2$, respectively.

Subsequently, the solvents in the slurry and the polymer solution were dried while the coated substrate was passed through a dryer, of which temperature was adjusted to 60□, to manufacture a separator.

The manufactured separator had a good Gurley value of 384 sec/100 mL.

To evaluate bondability to electrodes, the separator of example 1 was laminated and tested, and the evaluation result showed that bondability of the separator of example 1 was 9.3 gf/cm. Accordingly, it is found that the separator of example 1 has excellent bondability to electrodes.

Figure 2:
FIG. 2 is a scanning electron microscope (SEM) image illustrating a separator manufactured by coating with a slurry singularly according to a process of example 1 of the present invention, without coating with a polymer solution.
Figure 3:
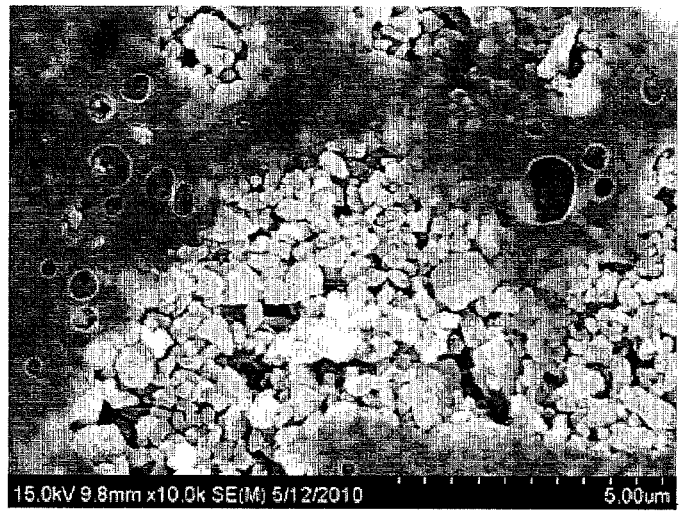
FIG. 3 is a SEM image illustrating a separator according to example 1 of the present invention.

FIG. 2 is a scanning electron microscope (SEM) image illustrating a separator manufactured by coating with a slurry singularly according to a process of example 1 of the present invention, without coating with a polymer solution. FIG. 3 is a SEM image illustrating the separator manufactured according to example 1 of the present invention. Referring to FIG. 3, it is found that a porous polymer outer layer is formed along the outmost periphery according to example 1 of the present invention.

Example 2

A separator was manufactured in the same way as the example 1, except a loading amount of a polymer solution was changed such that a loading amount of a resulting porous polymer outer layer was 0.6 g/m$^2$.

The manufactured separator had a good Gurley value of 368 sec/100 mL.

To evaluate bondability to electrodes, the separator of example 2 was laminated and tested, and the evaluation result showed that bondability of the separator of example 2 was 8.1 gf/cm. Accordingly, it is found that the separator of example 2 has excellent bondability to electrodes.

Comparative Example 1

A separator was manufactured in the same way as the example 1, except a slurry was coated on a porous substrate, a solvent in the slurry was dried and then a polymer solution was coated and dried again.

The manufactured separator had a Gurley value of 552 sec/100 mL, which is a value considerably increased over the examples 1 and 2.

To evaluate bondability to electrodes, the separator of comparative example 1 was laminated and tested, and the evaluation result showed that bondability of the separator of comparative example 1 was 3.7 gf/cm, which is lower than those of the examples 1 and 2.

Figure 4:
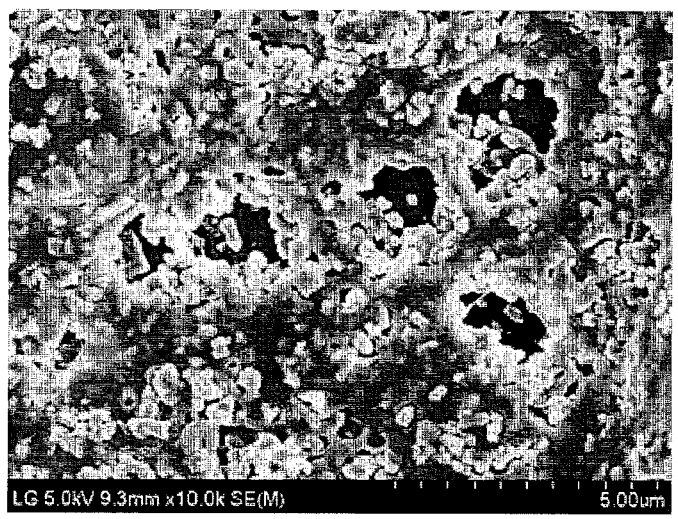
FIG. 4 is a SEM image illustrating a separator according to comparative example 1 of the present invention.

FIG. 4 is a SEM image illustrating the separator manufactured according to comparative example 1. Referring to FIG. 4, it is found that the manufactured separator has the increased surface roughness. In other words, it is found that the separator of comparative example 1 has a deterioration in a function of a polymer outer layer for improving bondability to electrodes.

What is claimed is:

1. A method for manufacturing a separator comprising:
   (S1) preparing a porous substrate having pores;
   (S2) coating a slurry on at least one surface of the porous substrate, the slurry containing inorganic particles dispersed therein and a first binder polymer dissolved in a first solvent;
   (S3) adjusting a loading amount of a second binder polymer in a binder solution such that a loading amount of the second binder polymer in a porous polymer outer layer is in the range between 0.1 and 3.0 g/m$^2$;
   (S4) coating the binder solution on the slurry, the binder solution consisting of a second binder polymer dissolved in a second solvent; and
   (S5) simultaneously drying the first and second solvents to form the porous polymer outer layer of the second binder polymer and an organic-inorganic composite inner layer, wherein the porous polymer outer layer has pores formed while the second solvent is dried, and the organic-inorganic composite inner layer has pores or interstitial volumes formed between the inorganic particles when the inorganic particles are bonded and fixed to each other by the first binder polymer while the first solvent is dried.

2. The method for manufacturing a separator according to claim 1, wherein the porous substrate is a polyolefin-based porous membrane.

3. The method for manufacturing a separator according to claim 1, wherein the porous substrate has a thickness between 1 and 100 μm.

4. The method for manufacturing a separator according to claim 1, wherein the inorganic particles have an average particle size between 0.001 and 10 μm.

5. The method for manufacturing a separator according to claim 1, wherein the inorganic particles are selected from the group consisting of inorganic particles having a dielectric constant of 5 or above, and inorganic particles having lithium ion conductivity, and the mixtures thereof.

6. The method for manufacturing a separator according to claim 5, wherein the inorganic particles having a dielectric constant of 5 or above are at least one selected from the group consisting of $BaTiO_3$, $Pb(Zr,Ti)O_3$ (PZT), $Pb_{1-x}La_xZr_{1-y}Ti_yO_3$ (PLZT, $0<x<1$, $0<y<1$), $PB(Mg_{1/3}Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$ and $TiO_2$, and the mixtures thereof.

7. The method for manufacturing a separator according to claim 5, wherein the inorganic particles having lithium ion conductivity are at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitrides ($Li_xN_y$, $0<x<4$, $0<y<2$), $SiS_2$-based glass ($Li_xSi_yS_z$, $0<x<3$, $0<y<2$, $0<z<4$), and $P_2S_5$-based glass ($Li_xP_yS_z$, $0<x<3$, $0<y<3$, $0<z<7$), and the mixtures thereof.

8. The method for manufacturing a separator according to claim 1, wherein a weight ratio of the inorganic particles to the binder polymer is 50:50 to 99:1.

9. The method for manufacturing a separator according to claim 1, wherein each of the first binder polymer and the second binder polymer has a solubility parameter between 15 and 45 Mpa$^{1/2}$, independently.

10. The method for manufacturing a separator according to claim 1, wherein each of the first binder polymer and the second binder polymer is, independently, at least one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinylacetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, and the mixtures thereof.

11. The method for manufacturing a separator according to claim 1, wherein each of the first solvent and the second solvent is, independently, at least one selected from the group consisting of acetone, tetrahydrofuran, methylene chloride, chloroform, dimethylformamide, N-methyl-2-pyrrolidone (NMP), cyclohexane and water, and the mixtures thereof.

12. The method for manufacturing a separator according to claim 1, wherein the content of the second binder polymer in the binder solution is in the range between 0.1 and 30 weight %.

13. A method for manufacturing an electrochemical device comprising:
preparing a separator;
interposing the separator between a cathode and an anode; and
laminating the separator,
wherein the separator is manufactured by the method of claim 1.

14. The method for manufacturing an electrochemical device according to claim 13, wherein the electrochemical device is a lithium secondary battery.

* * * * *